K. DOUGAN.
GRAIN STEAMER.
APPLICATION FILED JULY 6, 1905.
900,836.
Patented Oct. 13, 1908.
2 SHEETS—SHEET 1.
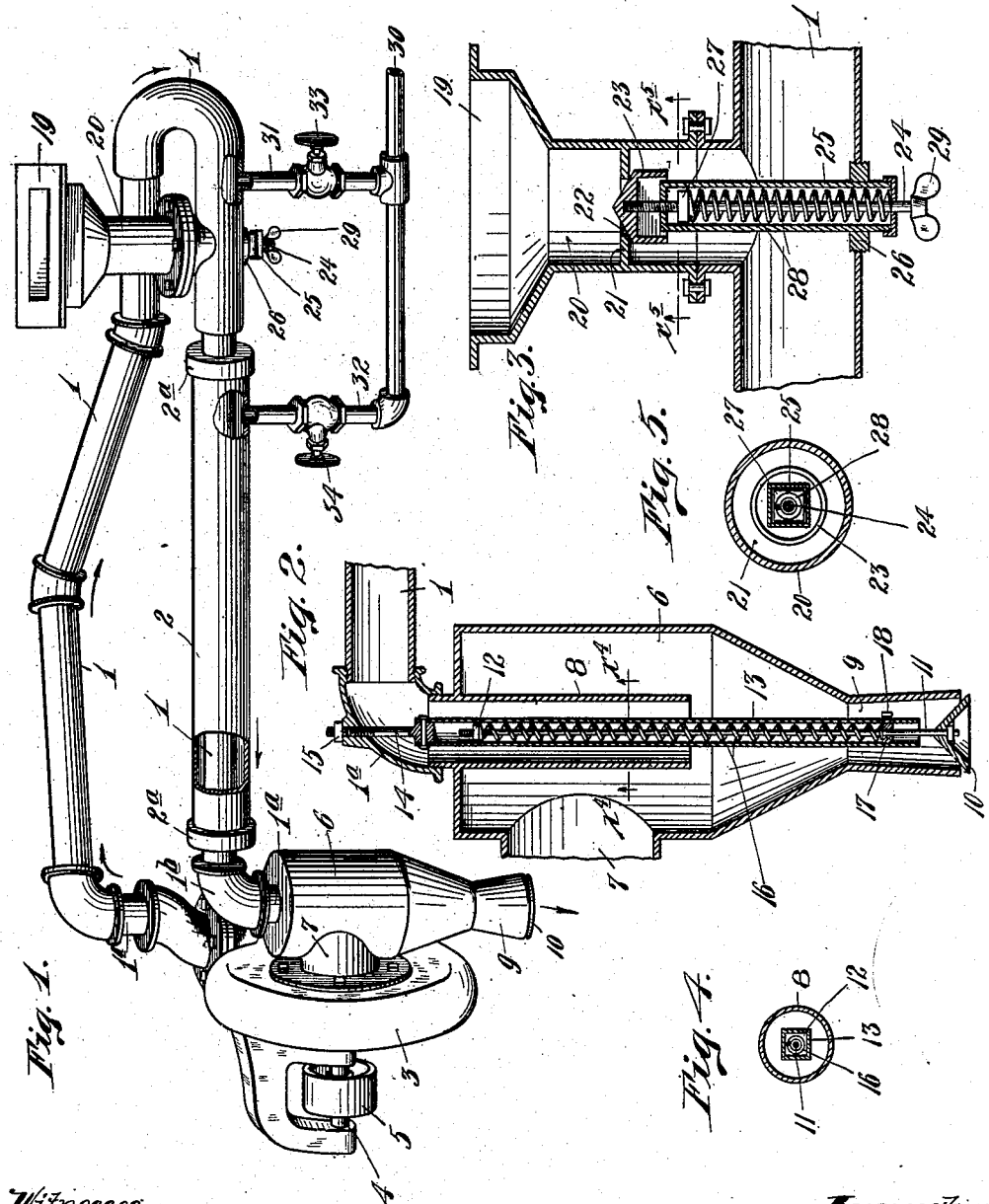
Witnesses.
E. W. Jeppesen.
A. H. Opsahl.
Inventor
Kennedy Dougan.
By his Attorneys.
Williamson & Merchant

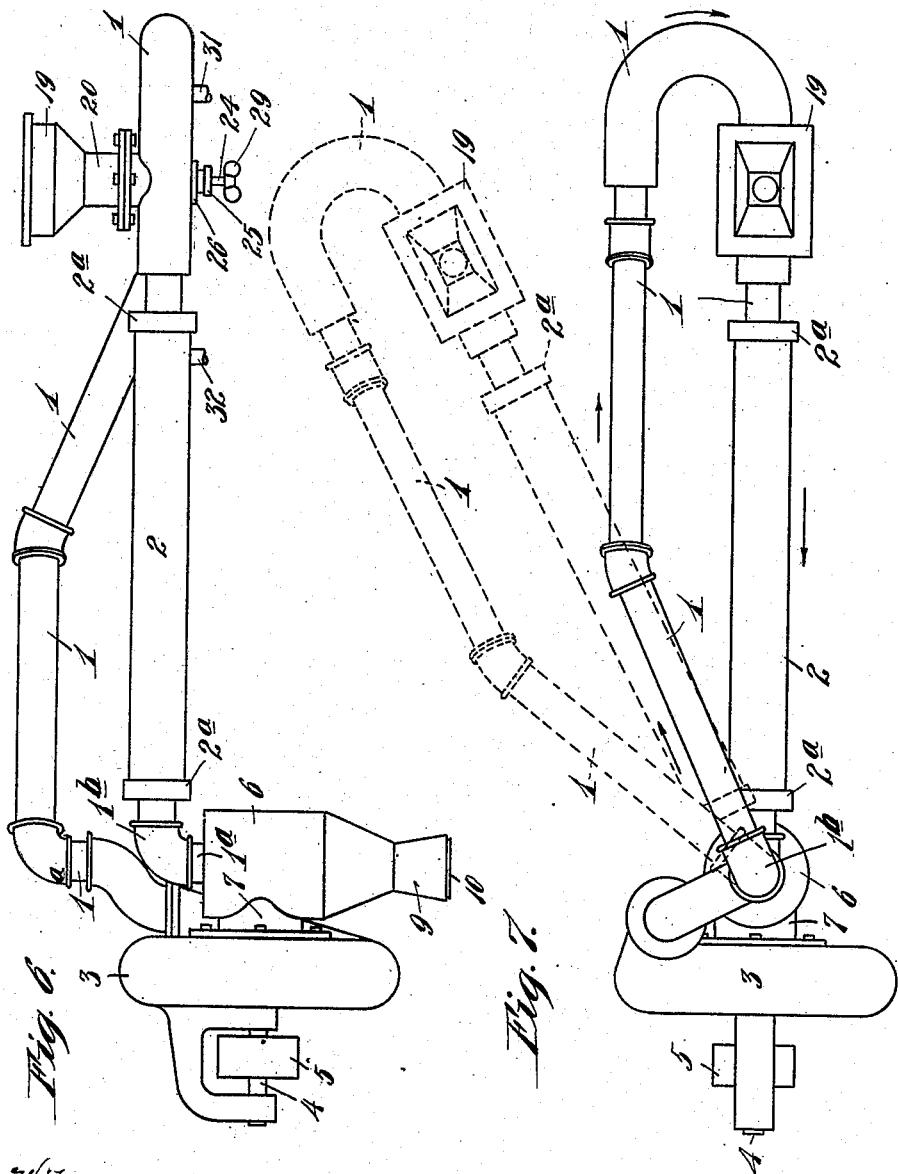

UNITED STATES PATENT OFFICE.

KENNEDY DOUGAN, OF MINNEAPOLIS, MINNESOTA, ASSIGNOR TO COLUMBIAN FEED GOVERNOR COMPANY, A CORPORATION OF MINNESOTA.

GRAIN-STEAMER.

No. 900,836.　　　　　Specification of Letters Patent.　　　　Patented Oct. 13, 1908.

Application filed July 6, 1905. Serial No. 268,462.

*To all whom it may concern:*

Be it known that I, KENNEDY DOUGAN, a citizen of the United States, residing at Minneapolis, in the county of Hennepin and State of Minnesota, have invented certain new and useful Improvements in Grain-Steamers; and I do hereby declare the following to be a full, clear, and exact description of the invention, such as will enable others skilled in the art to which it appertains to make and use the same.

My invention relates to grain steamers, and has for its object to improve the same in the several particulars hereinafter noted.

The invention consists of the novel devices and combinations of devices hereinafter described and defined in the claims.

All vertical or gravity grain steamers in use at the present time have serious inherent defects in the principle of their construction, due to an assumption that wheat and other grain have a fluidity which is substantially perfect. This is known to be untrue even of dry grain, while it is much less true of grain when in damp condition, as is the case during the steaming process. To illustrate, in the operation of these so-called gravity or vertical steamers, the amount of grain entering the steamer is usually regulated by the amount of steamed grain which leaves the steamer, and as this steamed grain does not flow steadily like water, but in quick short jerks, the grain is introduced into the steamer in the same irregular manner which results, as is obvious, in irregular tempering or steaming of grain.

In accordance with my invention, I employ an endless air-trunk, and means for producing a forced circulation of steam, or of steam and hot air therein, and I provide means whereby the grain is induced into said air-trunk, and after having traveled a considerable distance therein, and having been thoroughly commingled with the steam and air, is "trapped out" and discharged from the air-trunk.

Preferably, I employ a fan for producing a forced circulation of air in the endless air-trunk, which fan is interposed in said air-trunk so that its fan case forms a part thereof. Means is also provided whereby the induction of the grain into the air-trunk and eduction thereof from the air-trunk, is accomplished without allowing the escape of the steam or air to any material extent.

With this improved apparatus, the grain is caused to travel from the induction port to the eduction port, in a finely divided stream, and hence, is thoroughly and evenly steamed. Preferably, an endless air-trunk is disposed horizontally or approximately in such arrangement, but may nevertheless be set at an oblique angle to a perpendicular or in a perpendicular position.

What I consider the best form of the apparatus is illustrated in the accompanying drawings, wherein like characters indicate like parts throughout the several views.

Referring to the drawings: Figure 1 is a perspective view with some parts broken away, showing my improved endless air-trunk steamer. Fig. 2 is a sectional view taken centrally through that portion of the air-trunk which includes the grain trap and eduction port. Fig. 3 is a sectional view taken centrally through a portion of the air-trunk and through the induction hopper, induction port and coöperating eduction valve, and showing also the automatic eduction valve. Fig. 4 is a horizontal section looking upward, taken on the line $x^4$ $x^4$ of Fig. 2. Fig. 5 is a section on the line $x^5$ $x^5$ of Fig. 3. Fig. 6 shows the separator in side elevation, and Fig. 7 is a plan view of the separator, illustrating two of the many different positions that the body of the air-trunk may take, with respect to the fan and its shaft.

The numeral 1 indicates the endless air-trunk, which, as shown, is of tubular form, and is made up chiefly of quite large pipe sections. One of the straight horizontally disposed sections of the air-trunk 1, is surrounded by a jacket 2, preferably of tubular form, and which jacket, at its ends, has heads 2ª that form tight joints with the surrounded trunk section.

The numeral 3 indicates a fan, the case of which forms part of the endless air-trunk. The shaft 4 of the fan head is shown as provided with a pulley 5, over which a power driven belt, (not shown) is adapted to run to drive the fan. It is important to note, that the endless air-trunk 1, at 1ª and 1ᵇ is provided with swivel joints that are axially alined vertically, so that this body of the air-trunk may be swung in a horizontal plane, and set at various different angles with respect to the fan shaft 4. In practice the fan case and parts rigid therewith, including the bearings for the fan shaft 4 will be rigidly secured, usually from the overhead beam work, with the pulley 5, properly alined with the driving pulley or one of the running shafts of the mill, and the body of the air-trunk may then be adjusted, so as to bring the induction hopper 19 under the delivery spout (not shown), which spouts in different mills are located in different positions relative to the driving shafts. By means of this fan, a forced circulation of air is kept up in the air-trunk, in the direction of the arrows marked on the several views of the drawings.

A vertically disposed hopper-like grain trap 6 is connected at its upper portion to the eye of the fan, by means of a short neck 7. That section of the air-trunk which projects through the jacket 2, overlying the trap 6 is connected, by an elbow $a^1$, to a depending tube 8 that extends concentrically into the trap 6 with its open end terminating below the neck 7. The contracted bottom of the trap 6 terminates in a sleeve-like grain egress passage 9, which is normally closed by a conical valve 10, which valve is secured to the lower end of a valve stem 11. The valve stem 11 extends concentrically upward through the trap 6 and sleeve 9, and is provided at its upper end with a nut 12. The long sleeve 13, which is square in cross section, surrounds the stem 11, and, at its upper end, is rigidly secured to the head of a bolt 14, the upper end of which is screwed through a boss on the elbow $1^a$ and is provided with a jam nut 15, by means of which said bolt 14 and sleeve 13 are held against rotation. A long coiled spring 16 surrounds the valve stem 11 and reacts against the nut 12 and against the collar 17, which collar is loose on the valve stem 11, but is rigidly secured to the lower end of the sleeve 13, by means of a set screw 18. The spring 16 tends to hold the valve 10 in a position to close the egress passage through the sleeve 9. The nut 12 is free to move vertically in the rectangular sleeve 13, but is held against rotation thereby, so that the tension spring 16 may be varied by rotating the valve 10.

The grain to be steamed is introduced into a hopper 19 which is connected by a vertical tube 20 to the endless air-trunk, close to that end of the jacket 2 that is farthest from the trap 6. In the vertical tube 20 is a web 21 that is formed centrally with the large induction port 22. This induction port 22 is normally closed by a conical valve 23, which, as shown, is rigidly secured on the upper end of the valve stem 24. The valve stem 24 works loosely through both heads of a vertically disposed shaft 25, which, in turn, is passed through and rigidly secured to a plug 26 screwed into the bottom of the air-trunk 1, immediately below the induction port 22. Working with screw threaded engagement on the stem 24, within the shaft 25, is a nut 27 between which and the lower head of said shaft, is compressed a coiled spring 28 that surrounds the said stem. The sleeve 25 is preferably made square in cross section, so that it will prevent rotation of the nut 27. At its lower end the valve stem 24 is provided with a finger piece 29, by means of which it may be readily turned. By rotary movements of the valve stem 24 the nut 27 may be adjusted vertically, so as to vary the tension of the spring 28. The valve 23, of course, rotates with the stem 24, but this is simply an incidental action.

The numeral 30 indicates the steam supply pipe which is provided with branches 31 and 32, that open respectively into the endless air-trunk, and into the closed chamber formed within the jacket 2. The said branches 31 and 32 are preferably provided with valves 33 and 34 respectively, by means of which steam may at will be turned onto and cut off from the air-trunk, and the said steam jacket.

The operation of the improved steamer briefly summarized is as follows: The fan being put in motion, and the valves 33 and 34 being opened up, the wheat, or other grain, may be introduced into the hopper 19. A predetermined amount of grain, that is a stream of grain, which is usually regulated to a certain number of units of weight per unit of time, will by means not herein illustrated, be spouted into the hopper 19, and as soon as the pressure of the grain on the induction valve 23 is sufficient to overcome the spring 28, said valve will open up and permit the grain to flow into the air-trunk. The grain thus delivered into the air-trunk will be carried by the blast in a continuous stream, with the particles of grain separated, in such manner that the steam will come into complete contact with all the particles thereof, and will evenly steam and moisten the same. The heat radiated into the air-trunk from the steam jacket 2 will greatly assist in heating the grain, as the grain is passed therethrough by the air-blast. The grain after having been properly steamed will be precipitated into the hopper-like bottom of the trap 6, while the air and steam will continue their course and will circulate over and over again, through the endless air-trunk.

What I claim and desire to secure by Letters Patent of the United States is as follows:

1. The combination with an endless air-trunk including a fan and a grain trap, the latter having an eduction port for the grain, and said air-trunk having an induction port located at a point distant from said trap, of yieldingly closed valves controlling said induction and eduction ports and arranged to be opened by the pressure of grain thereon, and means for introducing steam or vapor into said air-trunk and to produce a blast to propel the grain therein, substantially as described.

2. The combination with an endless trunk having induction and eduction ports located at distant points, of means for producing a blast in said trunk, to propel the grain from said induction port to said eduction port, and means for applying steam or vapor to said grain while it is being propelled within said trunk, substantially as described.

3. In a device of the kind described, an endless air trunk having at least one swivel joint through which a portion of said air trunk is extended, the said swivel joint permitting the body of the air trunk to be pivotally adjusted around the axis of said joint, and the said air trunk having an induction port located at a point distant from said swivel joint, substantially as described.

4. In a device of the character described, an air-trunk having axially alined swivel joints constituting part of said air trunk and permitting the body of the air-trunk to be pivotally adjusted, and having an induction hopper applied to the said pivotally adjustable body section at a point distant from its pivot, substantially as described.

5. The combination with an air trunk and means for producing a blast of air therein to propel the grain, said air trunk having induction and eduction ports, of a valve coöperating with said eduction port, and an adjustable support for said valve having screw-threaded parts arranged to be adjusted by rotation of said valve, substantially as described.

In testimony whereof I affix my signature in presence of two witnesses.

KENNEDY DOUGAN.

Witnesses:
 H. M. RENSHAW,
 F. D. MERCHANT.